United States Patent [19]

Misato et al.

[11] 3,859,444
[45] Jan. 7, 1975

[54] METHODS OF KILLING BACTERIA USING ALKYLTHIOSEMICARBAZIDES

[75] Inventors: Tomomasa Misato, Tokyo; Toshiyuki Suzuki, Ageo; Taizo Nakagawa, Ageo; Kaoru Ohmori, Ageo; Takeo Baba, Tokyo; Shuichi Ishida, Omiya; Junichi Ishii, Tokyo, all of Japan

[73] Assignee: Nippon Kayaku Kabushiki Kaisha, Tokyo, Japan

[22] Filed: Feb. 16, 1973

[21] Appl. No.: 333,173

[30] Foreign Application Priority Data
Feb. 18, 1972 Japan.............................. 47-16152

[52] U.S. Cl. .............................................. 424/323
[51] Int. Cl. ......................... A01n 9/12, A01n 9/20
[58] Field of Search ..................................... 424/323

[56] References Cited
OTHER PUBLICATIONS

Chem. Abst., Donovick et al., Vol. 40 pp. 6562-6563 (1946).

Jensen et al., Acta Chem. Scand. 1968 22(1), pages 1,2,3 & 48-50.

Primary Examiner—Albert T. Meyers
Assistant Examiner—Allen J. Robinson
Attorney, Agent, or Firm—Russell & Nields

[57] ABSTRACT

This invention relates to a germicidal composition for use in agriculture and horticulture, wherein said composition includes a compound expressed by the following formula

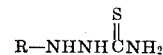

where R represents an alkyl group. An adjuvant may be used with said compound in forming said germicidal composition.

The germicidal composition of the present invention has remarkable exterminating effects on various kinds of bacteria or fungi which harm agricultural and horticultural plants or crops, particularly in preventing bacterial leaf blight of rice and citrus canker.

3 Claims, No Drawings

METHODS OF KILLING BACTERIA USING ALKYLTHIOSEMICARBAZIDES

BACKGROUND OF THE INVENTION

The compound of formula (1) is well-known and can be prepared by a known process. For example, when R stands for a methyl group, the compound can be prepared by reacting methyl formate with thiosemicarbazide, and reducing the reaction product with a reducing agent such as $LiAlH_4$. Furthermore, when R is an ethyl group, the compound can also be prepared by the interaction of acetoaldehyde and thiosemicarbazide to obtain a corresponding semicarbazone, and reducing the semicarbazone with a reducing agent such as $LiAlH_4$. However, the compound of formula (1) has not been used as a germicide prior to our invention.

DETAILED DESCRIPTION OF THE INVENTION

The germicidal compounds useful in the present invention are, for example, as follows: methylthiosemicarbazide, ethylthiosemicarbazide, propylthiosemicarbazide, butylthiosemicarbazide and the like. The germicidal composition of the invention may be employed, if necessary, in the form of a hydrate, powder, granules, fine or relatively large particles, emulsion, or suspension, depending upon particular conditions when used in agriculture or horticulture.

The concentration of the compound contained in the composition may be varied depending upon the manner of application or kinds of crops or plants on which the composition is to be applied, but generally within a range of 1 to 80% by weight. The composition is applied in an amount of 50 to 400g of the germicical compound per 10 ares, preferably 100 – 300 g/10 area. However, the amount may be varied, also depending upon the form of the composition employed, viz., in case of powder, fine or relatively large particles, or granules containing 1 to 20% by weight of the germicidal compound, the composition is used in an amount of 100 to 400 g/10 ares, preferably 150 to 300 g/10 ares, in terms of the germicidal compound; and in case the composition is in the form of a wettable power containing 10 to 80%, preferably 10 to 60%, by weight of the germicidal compound, or in the form of an emulsion containing 10 to 60%, preferably 10 to 40%, by weight of the germicidal compound, it is suitably diluted before application and dispersed in an amount of 50 to 250 g/10 ares, preferably 100 to 150 g/10 ares, in terms of the effective or germicidal compound.

The adjuvant used in the present invention includes all the substances other than the effective compound, which substances are added so as to enhance, maintain and increase the effects or power of the effective compound. The adjuvant includes various kinds of carriers and surface active agents. A carrier in the form of solid is, for example, kaolin, talc, diatomaceous earth, silica, sodium carbonate or the like; and the surface active agents include sodium alkylbenzenesulfonate, an ester of alkylsulfuric acid, an alkyl ether of polyethylene glycol, an aliphatic acid ester of polyethylene glycol and the like.

The germicidal composition of the present invention may be used alone or in combination with other agricultural and horticultural germicides, insecticides, nematocides, herbicides, plant-growth regulators, soil-improving agents or fertilizers. The excellent effects of the agricultrually and horticulturally useful germicidal composition of the present invention are illustrated particularly by the following examples.

EXAMPLE 1

Exterminating Test on Bacterial Leaf Blight of Rice.

(Spray test on surfaces of leaves)

Kinnampu was used as a test rice plant. Seeds of the rice plant were sown in pots ($15 \pm 5$ cm) and grown up for about 30 days. The leaves of the resultant seedlings were inoculated with xanthomonas aryzae, one spot per each leaf, by means of a needle. The thus-inoculated seedlings were placed in a moist chamber at 28°C for 24 hours. Thereafter, the germicidal composition, which was so diluted with water as to have a predetermined concentration, was sprayed over the seedlings in an amount of 12.5 ml per pot. The pots were continuously kept in the greenhouse. Two weeks after the inoculation, degrees of attack by the pathogen were observed and an "Effect Index" was calculated from the following equation Effect Index $$= \left(1 - \frac{\text{Attacked rate in treated areas}}{\text{Attacked rate in non-treated areas}}\right) \times 100$$

where

Attacked rate $$= \frac{\begin{array}{l}\text{Number of leaves under slight attack} \times 1 \\ + \text{Number of leaves under medium attack} \times 3 \\ + \text{Number of leaves under great attack} \times 5\end{array}}{\text{Total number of leaves tested} \times 5}$$

The test results are shown in Table 1 below.

As is apparent from Table 1, the composition of the present invention has remarkable effect in exterminating bacterial leaf blight of rice.

TABLE 1

| Germicidal compound | Concentration (p.p.m.) | Effect index | Phytotoxicity |
|---|---|---|---|
| Methylthiosemicarbazide | 800 | 98 | Nil |
| $\left(CH_3-NHNH\overset{S}{\overset{\|}{C}}NH_2\right)$ | | | |
| Ethylthiosemicarbazide | 800 | 96 | Nil |
| $\left(C_2H_5NHNH\overset{S}{\overset{\|}{C}}NH_2\right)$ | | | |
| n-Propylthiosemicarbazide | 800 | 95 | Nil |
| $\left(n\text{-}C_3H_7-NHNH\overset{S}{\overset{\|}{C}}NH_2\right)$ | | | |
| Phenazine (see Note 1) | 100 | 95 | Nil |
| Non-treated | | 0 | |

Note

Note 1: Phenazine (Trade Name) contains phenazine-5-oxide an effective component.

EXAMPLE 2

Exterminating Test on Bacterial Leaf Blight of Rice.

(Application on water surface)

Kinnampu was used as a test rice plant and its seedlings were grown up and inoculated in the same manner as in Example 1. The seedlings were placed in a moist chamber at 28°C for 24 hours, and then a predetermined amount of the composition of the present invention was dispersed on the water surface of the pots. The pots were continuously kept in the greenhouse. Two weeks after the inoculation, degrees of disease attack were observed, and attacked rates and an Effect Index were calculated by the same equation as used in Example 1.

The test results are shown in Table 2 below.

As is apparent from Table 2, the germicidal composition of the invention also shows excellent effects in exterminating bacterial leaf blight of rice when applied on water surface.

Table 2

| Germicidal Compound | Treated Amount | Effect Index | Phyto-toxicity |
|---|---|---|---|
| Methylthiosemicarbazide | 20% wettable powder 150 mg | 99 | Nil |
| Ethylthiosemicarbazide | 20% wettable powder 150 mg | 92 | Nil |
| n-propylthiosemicarbazide | 20% wettable powder 150 mg | 90 | Nil |
| Phenazine (see Note 1) | 10% wettable powder 150 mg | 86 | Nil |
| Non-treated | — | 0 | |

Note 1: Phenazine (Trade Name) contains phenazine-5-oxide as an effective component.

EXAMPLE 3

Exterminating Test on Citrus Canker (Spray test)

In each of unglazed pots having a diameter of 20 cm were planted two quadrennial summer oranges. Twenty leaves of each pot were inoculated with *xanthomonas citri*, one spot per leaf, by means of a needle. After the inoculation, the oranges were placed in a moist chamber at 30°C for 24 hours. Then, the oranges were air-dried and the composition of the invention having a predetermined concentration was sprayed in an amount of 50 ml per pot. Then, the pots were transferred to the greenhouse. Twenty days after the inoculation, degrees of disease attack were observed, and an Effect Index of the composition was calculated from the following equation.

Effect Index
$$=\left(1-\frac{\text{Attacked rate in treated areas}}{\text{Attacked rate in non-treated areas}}\right)\times 100$$

where

Attack rate $$=\frac{\begin{array}{l}\text{Number of leaves under slight attack}\times 1\\+\text{Number of leaves under medium attack}\times 3\\+\text{Number of leaves under great attack}\times 5\end{array}}{\text{Total number of leaves tested}\times 3}$$

The test results are shown in Table 3 below.

As is apparent from Table 3, the composition of the present invention also shows great effects in exterminating citrus canker when used as a dispersing agent.

Table 3

| Germicidal Compound | Concentration (ppm) | Effect Index | Phyto-toxicity |
|---|---|---|---|
| Methylthiosemicarbazide | 1000 | 57 | Nil |
| Ethylthiosemicarbazide | 1000 | 45 | Nil |

Table 3-Continued

| Germicidal Compound | Concentration (ppm) | Effect Index | Phyto-toxicity |
|---|---|---|---|
| n-propylthiosemicarbazide | 1000 | 42 | Nil |
| Agrept (see Note 1) | 1000 | 38 | Nil |
| Non-treated | — | 0 | |

Note 1: Agrept (Trade Name) contains sulfonate of streptomycin as an effective component.

The composition of the present invention will be particularly illustrated in the following composition examples. Parts used in Composition Examples are parts by weight.

COMPOSITION EXAMPLE 1

20 parts of methylsemicarbazide, 3 parts of alkylbenzenesulfonic acid, 5 parts by weight of sodium lignin sulfonate and 72 parts by weight of kaolin were mixed to give 100 parts of a mixture. The mixture was sufficiently agitated until a uniform wettable powder was obtained. The resultant wettable powder could be used as a dispersing agent by suspending it in water.

Germicidal compounds other than methylthiosemicarbazide could also be used to give a wettable powder in the same manner as described above.

COMPOSITION EXAMPLE 2

Talc was mixed with 5 parts of ethylthiosemicarbazide to obtain a total of 100 parts of a mixture. The mixture was sufficiently uniformly agitated to give a powder agent. The powder agent could be sprayed over crops or plants.

COMPOSITION EXAMPLE 3

5 parts of n-propylthiosemicarbazide, 20 parts of bentonite, 1 part of sodium ligninsulfonate, 1 part of sodium alkylbenzenesulfonate and 73 parts of talc were uniformly agitated and mixed. 16 parts of water were added to the mixture, and the resultant mixture was kneaded. The kneaded mixture was formed into granules by means of a granulating machine having a sieve of 1.0 to 0.5 mm and the granules were dried to obtain a granular agent. The granular agent could be applied to crops or plants by a dispersing implement or by hand.

COMPOSITION EXAMPLE 4

966 parts of relatively large non-oil-absorptive mineral particles, about 80% of the particles having a size within a range of 105 to 44 $\mu$, were introduced into a suitable mixer. A 25% methanol solution containing 40 parts of carbowax 20,000 (Trade Name) were slowly added to the particles while agitating. Furthermore, 30 parts of methylsemicarbazide were charged into the mixer with agitation to cover the mixture. Then, hot air was introduced into the mixture to evaporate the methanol to obtain methylthiosemicarbazide-covered particles. The resultant particles could be dispersed by means of a sprayer.

What is claimed is:

1. A method of exterminating bacteria selected from the group consisting of *Xanthomonas oryzae* and *Xanthomonas citri* which comprises applying to plants or crops infested with said bacteria between 50 grams per 10 ares and 400 grams per 10 ares of the compound expressed by the formula:

$$\text{R—NHNH}\overset{\overset{\text{S}}{\|}}{\text{C}}\text{NH}_2$$

where
R is an alkyl group selected from the group consisting of methyl, ethyl and n-propyl.

2. The method of claim 1, wherein said bacteria is *Xanthomonas oryzae*.

3. The method of claim 1, wherein said bacteria is *Xanthomonas citri*.

* * * * *

UNITED STATES PATENT OFFICE
CERTIFICATE OF CORRECTION

Patent No. 3,859,444      Dated January 7, 1975

Inventor(s) Tomomasa Misato et al.

It is certified that error appears in the above-identified patent and that said Letters Patent are hereby corrected as shown below:

In the specification, column 1, line 42, "power" should read --powder--. Column 2, under the paragraph entitled EXAMPLE 1, line 8, "$\pm$" should read --x--. Column 2, under the paragraph entitled EXAMPLE 1, line 10, the word "aryzae" should read --oryzae--.

Signed and sealed this 1st day of July 1975.

(SEAL)
Attest:

RUTH C. MASON
Attesting Officer

C. MARSHALL DANN
Commissioner of Patents
and Trademarks